Patented Oct. 19, 1926.

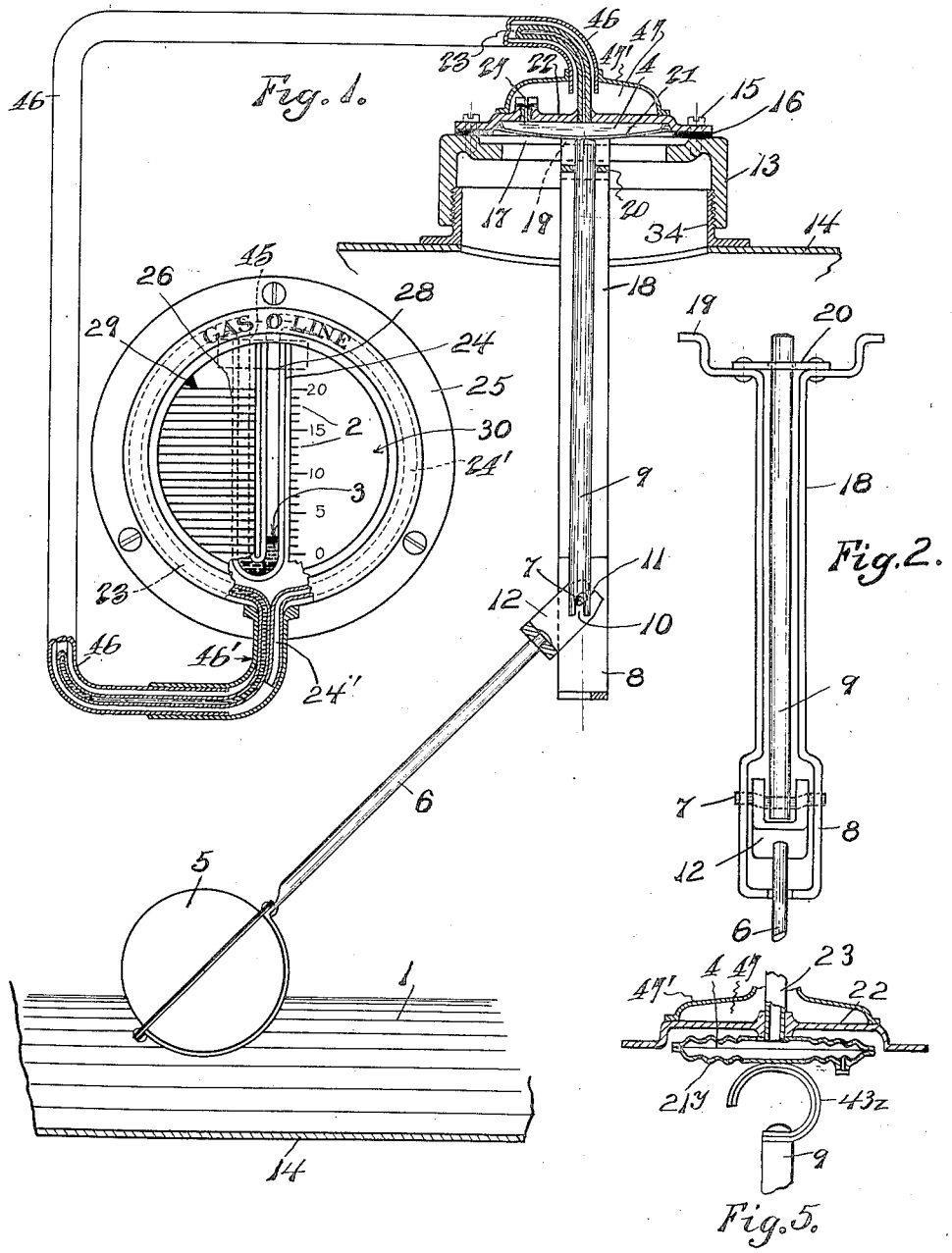

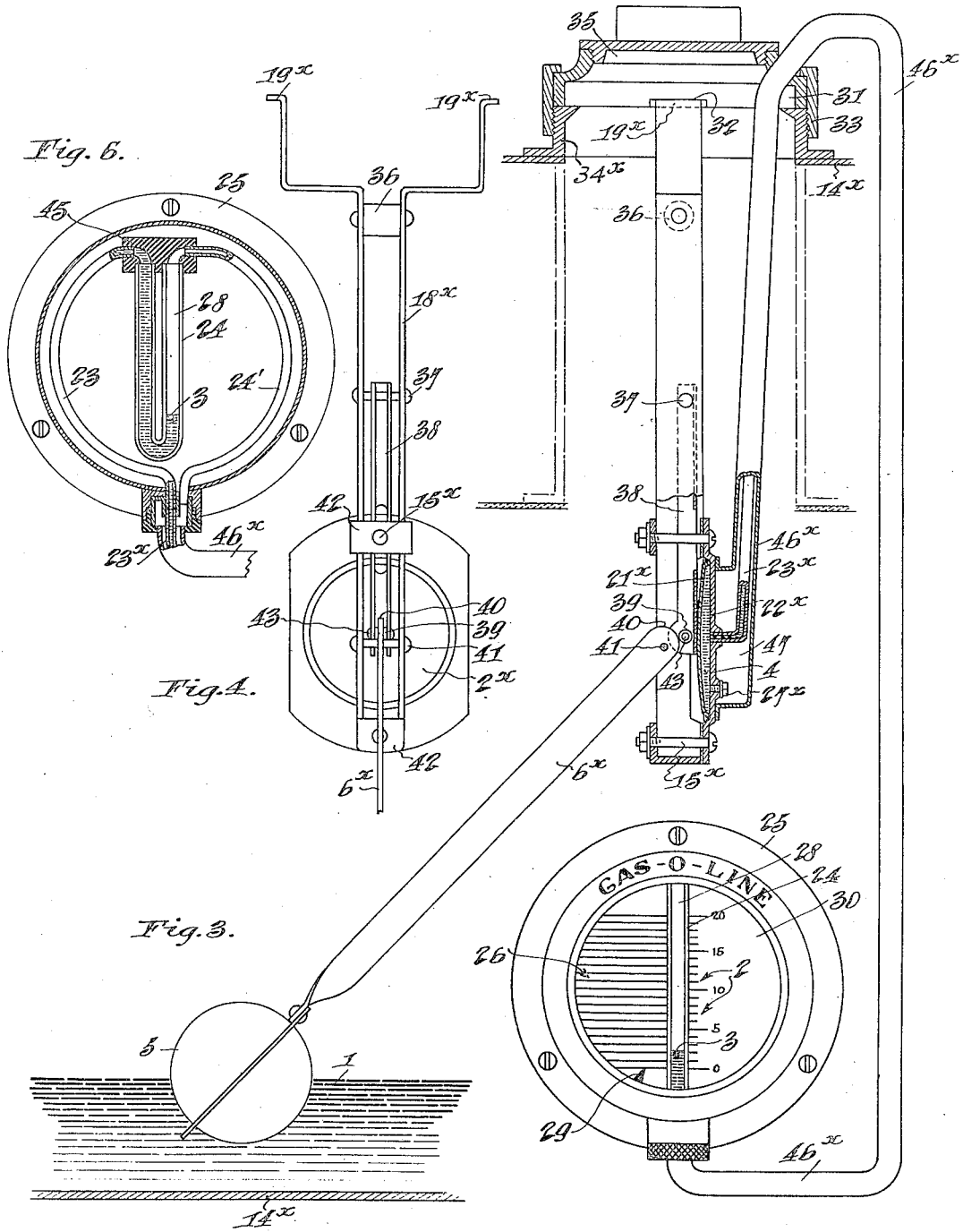

1,603,716

UNITED STATES PATENT OFFICE.

HARRY BEAUREGARD ROSS, OF DENVER, COLORADO, ASSIGNOR, BY MESNE ASSIGNMENTS, OF ONE-HALF TO WILLIAM W. WATSON.

INDICATING MECHANISM.

Application filed May 15, 1920, Serial No. 381,694. Renewed July 27, 1926.

This invention has for its object to provide an indicating mechanism for showing, at a distance from a reservoir containing a liquid, the level of the liquid in the reservoir by means of graduations on a dial to register with a fluid-piston actuated by the application of pressure to a fluid reservoir through the medium of a float and lever device actuated by the level of the liquid contained in the distant reservoir.

More specifically, the present invention has for its object to provide a gasoline indicator for use in connection with gasoline reservoirs and tanks on motor vehicles, motor boats and the like, and in its generic nature the invention comprises an indicator dial mechanism located at a convenient place for observation and a float controlled device located in a distant reservoir containing the fluid whose level is to be indicated and fluid containing ducts between the float device and the indicator dial cooperative with a flexible reservoir designed to be operated through the motions of the float to shift the level of the indicating fluid and thereby indicate the contents of the distant reservoir.

In its more detail nature, the invention resides in those novel details of construction, combination and arrangement of parts, all of which will be first fully described, then be specifically pointed out in the appended claims and illustrated in the accompanying drawings, in which:

Figure 1 is a view largely diagrammatic, partly in vertical section and partly in elevation, illustrating one form of my invention.

Figure 2 is a detail elevation of a portion of the same.

Figure 3 is another view largely diagrammatic, parts being broken away and other parts being shown in section and illustrating a modified form of the invention.

Figure 4 is a detail elevation of a portion of the mechanism shown in Figure 3.

Figure 5 is a detail view of a modification of the invention.

Figure 6 is a detail sectional face view of the indicator shown in Figure 3.

In the drawings, in which like numerals and letters of reference indicate like parts in all of the figures, 1 represents the liquid in the tank or distant reservoir 14, the level of which liquid is to be indicated on the indicator proper 25, which is located at some place distant from the reservoir 14 as, for example, on the dash of an automobile, where it may be easily viewed. The indicator 25 is provided with graduations 2 to cooperate with the fluid-piston 3 that is actuated by the application of pressure to the fluid-piston's reservoir 4 by means of a float 5 acting through a lever 6 and crank 7, the latter being pivoted to the frame 8 and to a vertical thrust rod 9 which is guided in a plate 20 and is adapted to exert a thrust on the flexible diaphragm 21 of the reservoir 4. The vertical thrust rod 9 has its lower end slotted as at 10 to fit and pivot on the crank part proper of the crank 7. The crank 7 is clamped in the slot 11 of the clevis 12 in such manner that the crank will lie substantially in a plane containing the axis of the lever 6. 13 is a cap screwed onto the reservoir 14 over the aperture through which the float device is introduced into the reservoir so as to close the aperture. Attached to the cap is an incompressible fluid reservoir 47 and a compressible fluid reservoir 4 consisting of a non-elastic cap plate 22 which is fastened to the cap 13 by screws 15, an elastic gasket 16 being interposed. The fluid reservoir 4 also includes the flat flexible diaphragm 21 the elasticity of which continuously tends to belly it outward to remain in contact with the thrust rod 9. The gasket 16 prevents leakage from the fluid reservoir 14 and also serves as a means by which the fluid-piston 3 may be inwardly adjusted. The cap 13 is made with an inner annular groove 17 to receive the frame hangers 19 and hold them in such a manner that the float 5 can be held in the desired location against turning around the axis of the rod 9 as a center while tightening down the cap 13.

The frame 18 is formed by a bar of suitable length having its upper ends bent for hangers 19 to lie in the annular groove 17 of the cap 13 in which position it is clamped by means of the screws 15 used to attach the compressible reservoir 4 to the cap 13. Extending downwardly the sides of the frame 18 are separated by the guide plate 20 for the thrust rod 9.

The float 5 is attached to the lower end of the lever 6, which lever is pivoted to the frame 18 by means of the crank 7, as before described. The crank 7 rotates with the lever 6 as it is clamped in the clevis 12 in the slots 11 through which the motion of the float 5 is transmitted by the crank 7 to the thrust rod 9, the upper end of which is in contact with the diaphragm 21 of the compressible reservoir 4.

The compressible reservoir 4 has its diaphragm 21 hermetically sealed to the rigid cap 22 and together with the cap 22 forms a fluid containing reservoir whose capacity may be varied by the action of the thrust rod 9, the reservoirs 4 and 47 being connected by ducts 23 and 46, respectively, with the indicator glass U tube 24 which is mounted in the indicator frame 25 to co-operate with the graduated dial 26, the dial 26 being covered by a suitable glass plate 30 that is susceptible of rotation in the frame and carries a pointer 29 etched into the glass or otherwise formed thereon. It should be understood that the glass plate 30 is held in the frame 25 of the instrument by retaining friction to a sufficient degree that it will maintain its positions of adjustment, such manner of retaining the glass being well known and, per se, forming no part of the present invention. The graduated dial 26 is divided into units of volume of the fluid 1 contained in the tank 14, the graduations themselves being indicated by the reference character 2.

In constructing the apparatus, the indicator glass 24 is connected with and sealed to the tube 23 and the tube 23 is sealed to the compressible reservoir 4, also the indicator glass 24 is connected with and sealed to open into tube 46 and tube 46 is sealed to open into the incompressible reservoir 47, it being understood that in the beginning of the manufacture, the upper ends of the glass U tube 24 are left open. The diaphragm 21 is then forced up toward the rigid plate 22 to compress it a desired amount and while holding the diaphragm compressed, the tubes 23 and 46 and the reservoirs 4 and 47 contain air or any suitable compressible fluid. The glass U tube 24 is one half filled with mercury or any other desirable fluid. The aperture 27 is tightly closed and sealed. The glass U tube 24 is fused at its upper end 45 to open into tube 23 completing the system from reservoir 4 to U tube 24. The diaphragm 21 is now released from its compressed position which allows the mercury to rise in that part of the U glass 24 opening into tube 23. The tube 46 is now sealed into the union member 46' with the interior of which it communicates. Then the short tube 24' is fused to open into U glass 24 at 28 and inserted and sealed to open into union member 46' of the frame 25. The above procedure connects tubes 46 and 24' so that the air pressure and temperature in the tube 46, chamber 47, tube 24' and air space 28 will be equalized. The cap 13 is now screwed onto the gasoline tank of the automobile with the float lever mechanism projected into the tank so that the float 5 rests on the bottom of the tank. The frame 18 is so arranged that it can be held stationary in the tank while cap 13 is being tightened.

Having placed the parts in position as shown, it is now necessary to effect the initial adjustment and this is done by tightening the screws 15 to compress the gasket 16 under the plate 22 so that the diaphragm 21 can be slightly compressed or released (according as the screws 15 are tightened or loosened) to level the mercury, or other fluid-piston 3, with the graduation marked zero on the visible dial 26, when 14 is empty.

The thrust rod 9 thrusts against the diaphragm 21 when the parts are adjusted to the initial position. Now, if fluid is introduced into the tank 1, the float is raised, thereby rocking the crank 7, lifting rod 9 and compressing the diaphragm 21 proportionately. Compression of the diaphragm 21 reduces the capacity of the reservoir 4 which causes the fluid to flow through the duct 23 and pressing on the fluid-piston 3 at 45 causes it to rise in the indicator glass 24, thus indicating the level of the liquid 1 in the tank 14.

Conversely, when the liquid is drawn out from the tank 14 or reduced in volume, the float 5 descends and with it, the rod 9 descends proportionately, thus allowing the diaphragm 21 to spring out further, thereby increasing the capacity of the reservoir 4 and lowering the pressure on fluid-piston 3, the level of the fluid-piston at 3 descends, in a proportional manner.

In Figures 3 and 4, I have shown a modified form of the invention. In these figures those parts bearing the same reference numerals as corresponding parts in Figures 1 and 2 are of the same construction, and those bearing the same reference numeral plus the index letter "x" are of substantially the same construction as the corresponding parts in Figures 1 and 2 and perform the same functions.

By reference to Figures 3 and 4, it will be seen that the compressible reservoir 4 is inserted down into the tank $14^x$ when applied to a tank having a long insertion collar or neck or to a tank where the liquid is to be introduced through the cap that covers the hole through which the float 5 is introduced as, for example, the gasoline tanks of the Essex and Ford automobiles. In this form, the frame $18^x$ is provided with hangers $19^x$ to fit into the recesses or slots 32 of the ring 31 which is secured over the filling aperture collar $34^x$ by a flanged collar 33, the ring 31 being closable by a cap 35. The hanger bars are spaced by a spacer 36 and the fluid reservoir is secured in place on the frame $18^x$ by means of bolts $15^x$ passing through clamp plates 42—42, and by tightening or loosening the bolts $15^x$ the initial adjustment of the capacity of the reservoir 4 is made in a manner similar to the adjustment of the reservoir in Figure 1, through the medium of the screws 15.

The lever $6^x$, which carries the float 5, is eccentrically pivoted at 41 to provide a cam end 40 to engage the roller 39 on the pin 43 that is carried by the bar 38 which is pivoted at 37 and which bears against the flexible diaphragm $21^x$ of the reservoir 4. In this form of the invention, the two compartment duct $23^x$ and $46^x$ passes through an aperture in the ring 31 in which aperture it is hermetically sealed in any desired way.

The operation of the form shown in Figures 3 and 4 is substantially the same as that shown in the preceding figures except that in lieu of the crank 7 and thrust rod 9, the cam 40 and bar 38 are provided. As the float 5 rises the cam 40 thrust against roller 39 will force the pivoted bar 38 against the diaphragm $21^x$ to force the fluid from the reservoir 4 and thus raise the fluid at 3 on the indicator and conversely as the fluid level in the reservoir $14^x$ lowers the fluid-piston 3 at the indicator will be likewise lowered.

The pointer 29 is preferably etched and colored in the glass crystal 30 over the indicator dial and the glass crystal can be turned to register with any of the graduations 2 to indicate the starting volume of the tank when the liquid in the tank is being consumed and it is desired to watch the consumption of gasoline per miles register on an adjoining speedometer for each trip or distance for the study of carburetor adjustment, etc.

While I have illustrated two embodiments of my invention, I desire it understood that other changes in the details of construction and arrangement of parts may be made without departing from the spirit of the invention or the scope of the appended claims.

In practice, the tube 23 contains air or any suitable compressible fluid and is held inside of tube 46 and is therefore submerged in the air or fluid of tube 46 for the purpose of creating approximately uniform temperatures in the fluids contained in both tubes.

The fluids of the two reservoirs 4 and 47 adjoin one another and will be of approximately the same temperature. From the above it will be seen that if the kind of fluid in the reservoir 4 and tube 23 is the same as contained in equal volume in reservoir 47 and tube 46 when the expansion of these fluids when there are temperature changes will correct the position of the fluid piston's relation to the graduations 2, by equal pressures at both ends of the fluid-piston 3, as will be clearly understood by those skilled in the art, since this device is designed for substantial accuracy throughout a range of temperature of approximately 120° F. or from 20° below zero or 100° above zero.

In Figure 5 is shown a modification of the invention. In this form the piston's reservoir 4 is composed of a double diaphragm $21^y$ which is soldered or otherwise rigidly secured on the end of the pipe 23, the latter being secured to the cap 22 in a similar manner.

The double diaphragm reservoir consists of the corrugated plates $21^y$ hermetically sealed together and so arranged that the rim of the reservoir is free to move, so that a thrust upward by the rod 9 compresses the lower plate $21^y$ and at the same time compresses the upper plate about the same distance, thus giving a more flexible action than in the form shown in the preceding figures.

This construction also allows greater expansion outwardly on the diaphragm away from one another, if German silver or brass is used for the diaphragm material and, under greater temperatures, will not stiffen and resist the movements of the thrust rod 9, so that the float 5 will not submerge deeper to actuate the diaphragm.

This invention will allow the use of non-freezing or non-evaporating fluid-pistons such as colored light mineral oils and fluids in the tubes and reservoirs other than air, etc.

As the alcohol and water solution, for instance, expands more than the mercury, this expansion can be compensated for by balancing one against the other inside of the system through the medium of the fluid-piston. The metal loop $43^z$ may be provided on the rod 9 to act as a compensator for variations in the different depths found in automobile gasoline tanks. The loop is constructed say of spring brass or steel and is soldered to underside of diaphragm 21 thus effecting a positive action to increase the volume of reservoir 4 when the float 5 is descending, (assuming that the lower end of the slot 10 in the thrust rod 9 is pinched together enough so that it will not slip off of the rod 7) by providing the spring loop $43^z$.

If the depth of the gasoline tank is such that when the reservoir plate $21^y$ has been fully compressed the ball 5 has not reached the bottom of the tank, further movement of the ball 5 downwardly would merely tend to compress the spring $43^z$ without throwing the full weight of the lever 6 and float 5 against the delicate diaphragm $21^y$. Thus, the spring $43^z$ acts, in a sense, as a compensator to allow the apparatus to be used in tanks havings some slight variations in depth.

From the foregoing description taken in connection with the accompanying drawings, it is thought the complete construction, combination and arrangement of parts will be understood by those skilled in the art.

What I claim is:

1. In a liquid level indicating device, a graduated dial, a U-glass tube cooperating with said dial, a compressible fluid reservoir with which one end of said U-glass tube is connected, a non-compressible fluid reservoir to which the other end of said tube is connected, non-miscible fluids of different specific gravities in said tube and reservoirs respectively, a buoyant lever and cooperative connections between said lever and said compressible fluid reservoir substantially as shown and described.

2. In a liquid level indicating device, a graduated dial, a U-glass tube cooperating with said dial, a compressible liquid-reservoir with which one end of said U-glass tube is connected, a non-compressible fluid reservoir to which the other end of said tube is connected, a liquid in said tube means for confining said fluid and compressible reservoir and a compressible fluid in said tube and non-compressible reservoir, a buoyant lever, and mechanism connecting said lever with said compressible reservoir for effecting said compressible reservoir according to the movements of the lever.

3. A fluid level indicator comprising a U-shaped transparent tube, a dial cooperating with one column of said U-shaped tube, two hermetically sealed reservoirs, a confined fluid acting between said reservoirs in cooperation with said one column of said transparent tube means for confining said fluid, a buoyant lever, and operating connections between said buoyant lever and one of said reservoirs for displacing the contents of said one of said reservoirs, said confining means including a visible indicating portion located in the U-tube.

4. A liquid level indicator consisting of a graduated dial, a compressible fluid reservoir, another reservoir, a duct between said reservoirs including a transparent portion associated with said dial, a plurality of fluids in said reservoirs and duct including a visible fluid in that portion of the duct which is transparent, said fluids being non-miscible and of different specific gravities, and a buoyant lever device cooperative with the compressible reservoir for actuating the same for the purposes described.

5. A liquid level indicator consisting of a graduated dial, a compressible fluid reservoir, a liquid visible in cooperation with said dial and confined between two equal volumes of confined fluids, means for containing said liquid and fluids, one of said confined fluids communicating with said reservoir, a buoyant lever device cooperative with the compressible reservoir and comprising a float lever, a thrust element adapted to engage the compressible reservoir and cooperative connections between said buoyant lever and said thrust element.

6. In a liquid level indicating device, a graduated surface and a fluid level starting position marker, a duct having a transparent portion cooperative with the graduated surface and the starting position marker, a fluid piston confined in said duct and visible through the visible portion thereof, a compressible reservoir connected with said duct and an incompressible reservoir connected with said duct, a hanger frame, a buoyant lever mounted on said hanger frame, and a connection between said buoyant lever and said compressible reservoir whereby the movements of the buoyant lever are imparted to the reservoir to vary the capacity of the same.

7. A liquid level indicator consisting of a graduated dial, a compressible fluid reservoir, a confined fluid column connected with said reservoir, means for confining said fluid, said means having a portion through which said fluid is visible in cooperation with said dial, a buoyant lever device cooperative with the compressible reservoir, said buoyant lever device comprising a float lever, a thrust element adapted to engage the compressible reservoir and itself adapted to be engaged by said buoyant lever, said thrust element including a reservoir depth compensating member.

8. A liquid level indicator consisting of a fluid piston, a U-shaped glass tube in which said fluid piston is held by gravity, a non-compressible reservoir, a compressible reservoir, a duct between said non-compressible reservoir and one leg of said U-tube, a duct between said compressible reservoir and the other leg of said U-tube, said reservoirs being of equal normal volume to counterbalance the position of said fluid piston in said U-glass tube throughout temperature changes, said fluid piston including relatively non-compressible and relatively compressible sections, a thrust element adapted to engage the compressible reservoir, a buoyant lever cooperatively connected with said thrust element for moving said thrust element, thereby to cause variations in the compressible fluid reservoir and thereby correspondingly vary the position of the visible part of the fluid piston in the U-tube, means for indicating said variations of position, said fluid piston comprising a plurality of non-miscible fluids.

9. A liquid level indicator consisting of a U-glass tube, a compressible fluid reservoir, means for centering one stem of said tube with said reservoir, another fluid reservoir, means for connecting said second reservoir with the other end of said tube, a fluid column confined in said U-glass tube and said reservoirs and in the connections between said U-glass tube and reservoirs, said fluid column comprising a plurality of non-miscible fluids of different specific gravities at least one of which is visible in said U-glass tube, a graduated dial adjoining said U-glass tube to indicate the variations in the level of the visible part of the fluid column in said U-glass tube, a buoyant lever device cooperative with the compressible reservoir for effecting the operation thereof.

10. In a liquid level indicating device, a U-glass tube, a graduated dial cooperative with one leg of said tube, a liquid reservoir and a duct between said reservoir and one leg of said tube, an air reservoir adjacent to said liquid reservoir and a duct between said air reservoir and the other leg of said U-tube, said air reservoir duct enclosing in part the duct of said liquid reservoir, a liquid in said liquid reservoir and the duct between said liquid reservoir and the U-tube, and a buoyant lever device cooperative with said liquid reservoir for actuating said liquid for the purposes specified.

11. In a liquid level indicating device, a graduated dial, a compressible fluid reservoir, a tube associated with said dial and connected with said reservoir, said tube and reservoir containing a fluid, a portion of which is visible in said tube adjacent to said dial, a float lever device cooperative with the compressible fluid reservoir, and means cooperative with the aforesaid structure for compensating for temperature variations.

12. In a liquid level indicating device, a graduated dial, a U-tube having a transparent leg cooperative with said dial, a compressible fluid reservoir, a duct connecting said reservoir with the visible leg of said U-tube, a float lever device cooperative with said compressible fluid reservoir, a liquid in said compressible reservoir, said duct and the visible leg of said U-tube, and means to compensate for temperature variations in the aforesaid structure, said compensating means comprising an air duct in communication with the other leg of said U-tube and enclosing substantially all of said duct between the compressible fluid reservoir and said U-tube.

13. A liquid level indicating device consisting of an indicator, ducts, a liquid and a non-liquid fluid contained in said ducts and in said indicator, said ducts being connected with said indicator, means for varying the position of the liquid in said ducts and indicator, said means including a buoyant lever device adapted to be operated by the variations in the level of the liquid whose level is to be indicated.

14. A means for indicating the level of liquids in a tank, said means comprising a U-tube, a duct connected to one leg of the U-tube and extended into the tank whose liquid level is to be indicated, said duct having its end within the tank closed, a duct connected with the other leg of the U-tube and extending into the tank, a visible liquid column located within the U-tube, fluids within said ducts, and means associated with the second mentioned duct for varying the fluid pressures within the same to effect movement of the liquid column within the U-tube according to the level of the liquid within the tank.

15. A means for indicating the level of liquids in a tank, said means comprising a U-tube, a duct connected to one leg of the U-tube and extended into the tank whose liquid level is to be indicated, said duct having its end within the tank closed, a duct connected with the other leg of the U-tube and extending into the tank, a visible liquid column located within the U-tube, fluids within said ducts, and means associated with the second mentioned duct for varying the fluid pressures within the same to effect movement of the liquid column within the U-tube according to the level of the liquid within the tank, said ducts being each of a capacity to confine equal volumes of fluid, whereby the liquid column in the U-tube will be confined between two fluid columns of equal volume.

16. A fluid level indicator comprising a face dial having a graduated scale thereon, a substantially U-form container, one leg only of which is both vertically disposed and exposed across the front of the dial, said container having an indicating fluid that rises and falls in the exposed leg of the container with its upper end coacting with the scale, a liquid reservoir, and means for causing the fluid in the exposed leg of the container to rise and fall correspondingly to the liquid level of the contents of the reservoir, said means including an actuating device that moves with the said liquid level.

17. A fluid level indicator comprising a substantially circular dial plate, a substantially U-form container having an exposed vertical transparent tubular leg extending centrally across the dial with its ends covered, said container having an idicating fluid body, one end of which traverses the exposed leg, an indicating scale on the face of the dial transversely to the exposed leg, a liquid reservoir, and means for moving the fluid in the exposed leg, and connected to the upper end of the unexposed portion of the container to cause the end of the fluid in the exposed leg to move with the level of the liquid in the reservoir, said means including an actuating device that moves with said liquid level in the reservoir.

HARRY BEAUREGARD ROSS.